(12) United States Patent
Farizon et al.

(10) Patent No.: US 8,103,685 B1
(45) Date of Patent: Jan. 24, 2012

(54) METHODS AND APPARATUS FOR CAPTURING LAST DISCOVERY TIME OF MANAGED OBJECTS

(75) Inventors: Boris Farizon, Westborough, MA (US); Anoop George Ninan, Milford, MA (US); Samuil Shmuylovich, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1332 days.

(21) Appl. No.: 11/731,467

(22) Filed: Mar. 30, 2007

(51) Int. Cl.
*G06F 7/00* (2006.01)
(52) U.S. Cl. ........................................ 707/758; 707/751
(58) Field of Classification Search .................. 707/758, 707/751
See application file for complete search history.

(56) References Cited

U.S. PATENT DOCUMENTS

2007/0079126 A1* 4/2007 Hsu et al. ...................... 713/176
2008/0046480 A1* 2/2008 Lou ................................ 707/202

* cited by examiner

*Primary Examiner* — Shahid Alam
*Assistant Examiner* — Donald Lawson
(74) *Attorney, Agent, or Firm* — Krishnendu Gupta; Gerald P. Kazanjian (57) ABSTRACT

A system receives, from an agent, an agent timestamp associated with a production of a collection of data. The system creates a history associated with the collection of data and the agent timestamp. The system receives an indication that processing the collection of data is complete, and associates the collection of data and the agent timestamp with at least one resource referenced within the collection of data.

19 Claims, 8 Drawing Sheets

204 RECEIVE, FROM AN AGENT, AN AGENT TIMESTAMP ASSOCIATED WITH A PRODUCTION OF A COLLECTION OF DATA

205 RECEIVE NOTIFICATION, FROM AN AGENT THAT A COLLECTION OF DATA, FROM THE STORAGE AREA NETWORK, IS AVAILABLE FOR PROCESSING

OR

206 RECEIVE NOTIFICATION, FROM AN AGENT, THAT THE COLLECTION OF DATA WILL BE TRANSMITTEDFOR STORAGE WITHIN A NETWORK MANAGEMENT DATABASE

OR

207 RECEIVE NOTIFICATION, FROM AN AGENT, THAT A POLICY HAS BEEN APPLIED TO THE COLLECTION OF DATA TO DETERMINE WHETHER TRACKING IS TO BE PERFORMED ON THE COLLECTION OF DATA

OR

208 RECEIVE, FROM AN AGENT, IDENTIFICATION OF AT LEAST ONE RESOURCE ASSOCIATED WITH THE COLLECTION OF DATA

FIG. 4

209 CREATE A HISTORY ASSOCIATED WITH THE COLLECTION OF DATA AND THE AGENT TIMESTAMP

210 IDENTIFY A HISTORY TABLE WITHIN A HISTORY DATABASE

211 CREATE A HISTORY RECORD WITHIN THE HISTORY TABLE, THE HISTORY RECORD ASSOCIATED WITH THE COLLECTION OF DATA AND THE AGENT TIMESTAMP

212 STORE THE AGENT TIMESTAMP IN THE HISTORY RECORD WITHIN THE HISTORY TABLE

*FIG. 5*

213 RECEIVE AN INDICATION THAT PROCESSING THE COLLECTION OF DATA HAS STARTED, IS UNDERWAY, AND/OR IS COMPLETE

214 ASSIGN A STORE PROCESS TO PERFORM PROCESSING ON THE COLLECTION OF DATA

OR

215 UPDATE THE HISTORY TO IDENTIFY THE STORE PROCESS ASSIGNED TO PERFORM PROCESSING ON THE COLLECTION OF DATA

OR

216 APPLY A RETENTION POLICY TO THE COLLECTION OF DATA TO DETERMINE WHETHER TO MAINTAIN THE HISTORY ASSOCIATED WITH THE COLLECTION OF DATA AND THE AGENT TIMESTAMP

OR

217 RECEIVE NOTIFICATION THAT A STORE PROCESS HAS COMPLETED PERSISTING THE COLLECTION OF DATA WITHIN A PRODUCTION DATABASE

*FIG. 6*

```
218 RECEIVE AN INDICATION THAT PROCESSING THE COLLECTION OF DATA IS
COMPLETE

219 UPDATE THE HISTORY INDICATING THAT THE PROCESSING OF THE
    COLLECTION OF DATA IS COMPLETE

220 INSERT A TIMESTAMP INTO A HISTORY RECORD OF A HISTORY
        TABLE OF A HISTORY DATABASE, THE TIMESTAMP INCLUDING AT
        LEAST ONE OF:
        i) THE AGENT TIMESTAMP
        ii) A TRANSACTION START TIMESTAMP ASSOCIATED WITH THE
        START OF THE PROCESSING OF THE COLLECTION OF DATA
        iii) A TRANSACTION FINISH TIMESTAMP ASSOCIATED WITH THE
        FINISH OF THE PROCESSING OF THE COLLECTION OF DATA 221 CONVERT THE TIMESTAMP TO ACCOUNT FOR A TIME ZONE
        ASSOCIATED WITH THE HISTORY DATABASE 222 IDENTIFY A COMPUTERIZED DEVICE ON WHICH THE
            HISTORY DATABASE IS OPERATING

223 IDENTIFY A TIME ZONE ASSOCIATED WITH THE
            COMPUTERIZED DEVICE

224 CONVERT THE TIMESTAMP TO THE TIME ZONE
            ASSOCIATED WITH THE COMPUTERIZED DEVICE ON WHICH
            THE HISTORY DATABASE IS OPERATING
```

*FIG. 7*

225 ASSOCIATE THE COLLECTION OF DATA AND THE AGENT TIMESTAMP WITH AT LEAST ONE RESOURCE REFERENCED WITHIN THE COLLECTION OF DATA, THE AGENT TIMESTAMP INDICATING A RELATIVE AGE OF THE COLLECTION OF DATA WITH RESPECT TO THAT RESOURCE

226 UPDATE A HISTORY RECORD WITHIN A HISTORY TABLE OF A HISTORY DATABASE TO INCLUDE AN IDENTIFICATION OF THE AT LEAST ONE RESOURCE REFERENCED WITHIN THE COLLECTION OF DATA

227 IDENTIFY THE HISTORY RECORD OF THE HISTORY TABLE AS CONTAINING LATEST DATA ASSOCIATED WITH THE COLLECTION OF DATA

*FIG. 8*

METHODS AND APPARATUS FOR CAPTURING LAST DISCOVERY TIME OF MANAGED OBJECTS

BACKGROUND

The rapid expansion of information service and data industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A SAN Administrator (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated management workstation to allow a network administrator to visualize and remotely control and manage the various elements within the storage area network that are graphically represented by the console by a Graphical User Interface (GUI) Management of SAN environments is a daunting task and typically requires Storage Resource Management solutions such as EMC's Control Center (ECC) family of products, available from EMC Corporation of Hopkinton, Mass., U.S.A. ECC includes agents that are deployed on host computer systems in a SAN for the purpose of gathering data about the various managed resources in the SAN. The agents periodically collect network management data on components such as hosts, switches and storage systems, as well as on applications that operate in these environments. In other words, agents collect data associated with the managed resources, and that data is inserted into databases for use within Storage Resource Management solutions, such as ECC. ECC identifies the entire process of retrieving the collected data from agents to storage of such data as a transaction. Agents collect data periodically, such as nightly, on the resources and engage in a transaction to send the collected data to an ECC repository for access by ECC applications such as console and server processes that allow SAN administrators to manage the SAN.

There are often different respective agents specifically designed (e.g., coded in software) to remotely manage, control and collect data from data storage system resources, database applications, switches, and so forth. Agents receive remote management commands from the server (i.e., via a user at the console controlling the server) and apply functionality associated with those management commands to the managed resources within the storage area network for which those agents are designated to manage. Agents are also responsible for periodically (e.g., nightly) collecting configuration or management data concerning the storage area network resources that those agents are responsible for managing. As an example, an agent that is responsible for monitoring and control of a large data storage disk array system might be configured to collect management data from that storage array on a nightly basis. This agent data collection process might include communicating with the storage array to query the array for information concerning all devices (e.g., logical storage devices) configured at that time within the array. This may result in the collection of large amounts of management data from certain managed SAN resources, such as large storage array in which there can be many thousands of devices configured for operation. The management data collected from the agent is also known as agent data.

Agents transmit this collected agent data back to an assigned storage component, also known as a store process. The store process receives the collected agent data from the agent and processes and stores this information into a storage area network management database for access by the server and console components. The management database thus provides managed object data (i.e., agent data that has been stored in the management database) for all managed resources in the SAN. The console component can interact with the server component to obtain current network information such as performance, capacity, load or other data concerning managed resources within the storage area network by accessing the managed object data maintained in this manner within the network management database.

SUMMARY

Conventional mechanisms and techniques for managing the collection and processing of data for managed resources by network management applications suffer from a variety of deficiencies. In particular, conventional mechanisms and techniques are limited in that it is difficult in such conventional network management applications to specifically identify a "last discovery time" of managed object data as collected by agents and processed into the management database. This is due in part to the fact that in such conventional systems, there are potentially more than one Agent process managing a resource and executing on different hosts and in different geographies, while coordinating this data collection with the Server and Store processes which can also be located on different hosts and in different geographies. As a result of such distributed processing, a single timestamp does not provide adequate information about the freshness of data persisted in the management database. Therefore, when reports are created from management data within the network management database, there is no mechanism by which to accurately determine how 'fresh' the data within the reports is and how long certain aspects of data processing of agent data take.

Embodiments disclosed herein operate to significantly overcome these and other deficiencies associated with conventional mechanisms and techniques for managing the collection and processing of management data for managed resources by network management application. In particular, embodiments disclosed herein provide a data management tracking process that receives notification that the agent has collected data and an agent timestamp indicating the time the agent collected the data.

For example, in one configuration an agent collects data from a resource, such as a data storage system and sends a notification that the agent has collected data along with a timestamp to the server process. The server receives this information (i.e., the agent timestamp and notification that the agent has collected the data). The data management tracking process (operating within the server) creates a history associated with the collection of data and the agent timestamp. In an example embodiment, the history is a history table within a history database. The data management tracking process creates a history record and inserts the agent timestamp, received from the agent, into the history table together with other pertinent information identifying the data collection instance.

The server then assigns a store process to process the collection of data gathered by the agent, and the data management tracking process updates the history record in the history table with an identifier associated with the selected store process. The store process and the agent perform a process of storing the data into a database. This agent/store process, sometimes called a transactional staging process, can often take a significant amount of time. During the transactional staging process, the history record in the history table is updated with the time when the store received the data from the agent, the time the transactional staging processing began, and the time the transactional staging processing completed. Other timing information can be maintained in this history table as well. Upon receiving notification that the transactional staging process is complete, the data management tracking process updates the history record in the history table with the further information that the transactional staging processing is complete. By collecting and maintaining a detailed history and timing of operations involved with collection of data by an agent and processing and storage of that data within a management database, the management application can produce a detailed accounting of this data collection processing.

In one configuration, within the history record in the history table, there is one column that contains a string representing the timestamp the store received data from the agent, the timestamp associated with the start of the transactional staging process, and the timestamp associated with the completion of the transactional staging process. The data management tracking process converts these three timestamps to the time zone associated with the computerized device on which the history table is operating, and inserts the converted timestamps in three different columns within the record in the history table. This time conversion is done so that all timestamps in the history record are normalized to a common time system. The data management tracking process updates the history record in the history table to include an identification of at least one resource (i.e., a principal object) associated with the collection of data. The data management tracking process then identifies the history record as containing the most recent data associated with the collection of data. In an example embodiment, the data management tracking process applies a retention policy to the collection of data to determine whether to maintain a history record within the history table associated with the collection of data. Reports may be generated on the data to identify the 'freshest' data as well as to identify problems and bottlenecks within the processing of the collection of data from the agent to the production database.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following more particular description of preferred embodiments disclosed herein, as illustrated in the accompanying drawings in which like reference characters refer to the same parts throughout the different views. The drawings are not necessarily to scale, with emphasis instead being placed upon illustrating the embodiments, principles and concepts disclosed herein.

DETAILED DESCRIPTION

Embodiments disclosed herein include methods, apparatus and systems that provide a data management tracking process within a data management framework used for management of a network environment. The data management tracking process operates to receive a notification that the agent has completed collecting data from a resource for storage by the management application, together with the agent timestamp indicating the time the agent collected the data. For example, the agent may collect data from a resource, such as a large data storage system, for placement as managed object data within the management database for access by the network management application. The agent may perform processing on the collected data and then sends a notification to the server process that the agent has collected data. This notification includes, in one configuration, a timestamp indicating the time of data collection by the agent.

The server receives this information (i.e., the agent timestamp and notification that the agent has a collection of data available for processing). The data management tracking process (operating on, within or as part of the server) creates a history associated with the collection of data and the agent timestamp. In an example embodiment, the history is a history table within a history database. A history record is created, and the agent timestamp, received from the agent, is inserted into the history table along with information identifying the data collection instance.

The server then assigns a store process to process the collection of data, and updates the history record in the history table with an identifier associated with the selected store process. The store process and the agent perform a storing or staging process to have the agent data placed into a management database. During the storing process, the history record in the history table is updated with the time the transactional staging processing began, and the time the transactional staging processing completed. By keeping a history table that includes details such as timestamps of various events associated with the collection and storage of data from resources in a storage area network, the system disclosed herein can be used for detailed evaluation of this agent collection and data storage process (e.g. to identify bottlenecks) and allows the system to know an "age" of collected data in the database. Upon receiving notification that the transactional staging process is complete, the data management tracking process updates the history record in the history table with the information that the transactional staging processing is complete.

Within the history record in the history table, there is data representing the timestamp associated with store receiving data from the agent, a timestamp associated with the start of the transactional staging process, and a timestamp associated with the completion of the transactional staging process. Other timestamps can be included as well. The data management tracking process in one configuration converts these timestamps to a time zone associated with the computerized device (e.g. server) on which the history table is operating, and maintains the converted timestamps within a record in the history table. The data management tracking process updates the history record in the history table to include an identification of at least one resource (i.e., a principal object) associated with the collection of data. The data management tracking process then identifies the history record as containing the most recent data associated with the collection of data. In an example embodiment, the data management tracking process applies a retention policy to the collection of data to determine whether to maintain a history record within the history table associated with the collection of data. Reports may be generated on the data to identify the 'freshest' data as well as to identify problems and bottlenecks within the processing of the collection of data from the agent to the production database.

Figure 1:
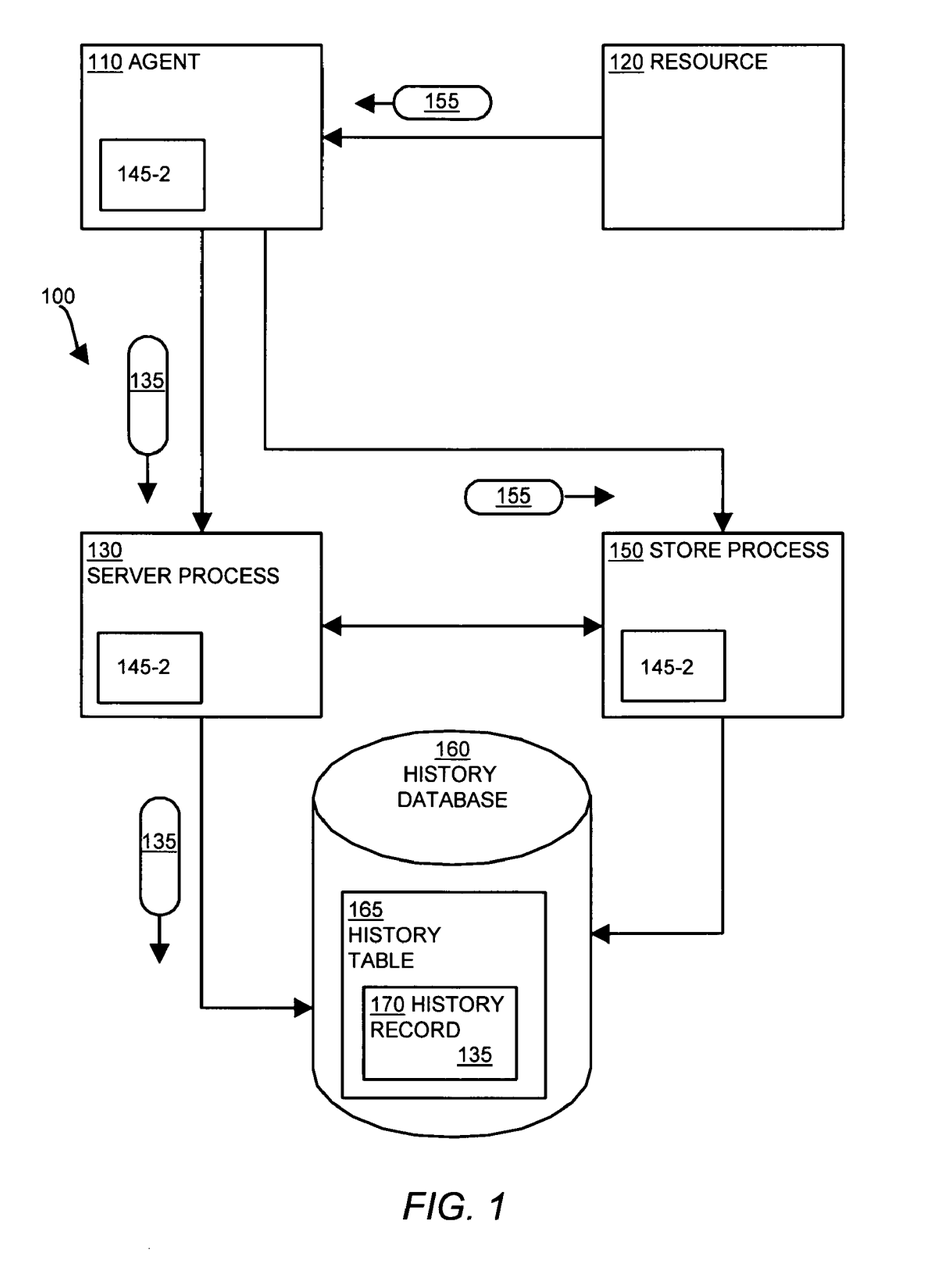
FIG. 1 illustrates an example storage area network and computing system environment including the data management tracking process configured to operate according to embodiments disclosed herein.

FIG. 1 illustrates an example of a networking environment suitable for use in explaining example embodiments. In this example, the networking environment is a storage area network 100 that includes an agent 110 that receives a collection of data 155 from a resource 120 (such as a Symmetrix, etc.). The agent 110 notifies the server 130 that the agent has a collection of data 155 available for transmission to the store 150, and transmits an agent timestamp 135 to the server 130. The data management tracking process 145-2 (operating on the agent 110, the server 130 and the store 150) creates a history record 170 in a history table 165 within a history database 160 and stores the agent timestamp 135 within the history record 170. The data management tracking process 145-2 assigns a store process 150 to perform processing on the collection of data 155.

Figure 2:
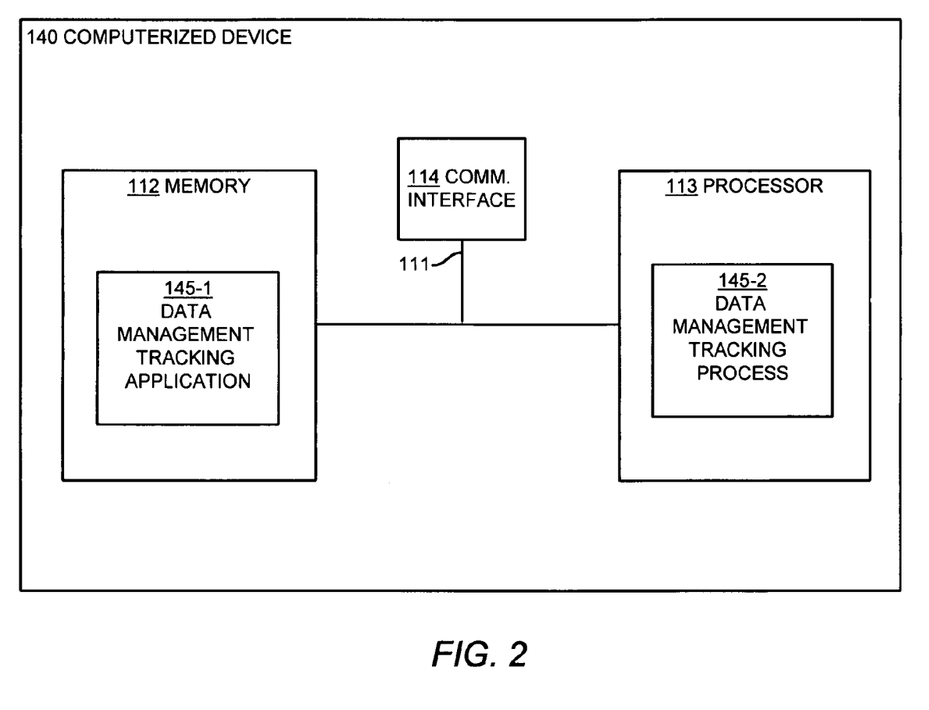
FIG. 2 illustrates an example computer system architecture for a computer system that operates a data management tracking process in accordance with embodiments disclosed herein.

FIG. 2 illustrates an example architecture of a computerized device 140. The computerized device 140 may be any type of computerized device such as a personal computer, workstation, portable computing device, console, laptop, network terminal or the like. It should be noted that the definition of computerized device 140 encompasses a computer system operating either the agent 110, server 130 and/or store 150 as explained within FIG. 1. In this example, the computerized device 140 includes an interconnection mechanism 111 that couples a memory system 112, a processor 113, and a communications interface 114. The communications interface 114 enables the computerized device 140 to communicate with other devices (i.e., other computers) on a network (not shown). This can allow access to the data management tracking application 145-1 to be accessed by remote computer systems.

The memory system 112 may be any type of computer readable medium that is encoded with an data management tracking application 145-1 that may be embodied as software code such as data and/or logic instructions (e.g., code stored in the memory or on another computer readable medium such as a removable disk) that supports processing functionality according to different embodiments described herein. During operation of the computerized device 140, the processor 113 accesses the memory system 112 via the interconnect 111 in order to launch, run, execute, interpret or otherwise perform the logic instructions of the data management tracking application 145-1. Execution of the data management tracking application 145-1 in this manner produces processing functionality in a data management tracking process 145-2. In other words, the data management tracking process 145-2 represents one or more portions of runtime instances of the data management tracking application 145-1 (or the entire application 145-1) performing or executing within or upon the processor 113 in the computerized device 140 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the data management tracking process 145-2.

Figure 3:
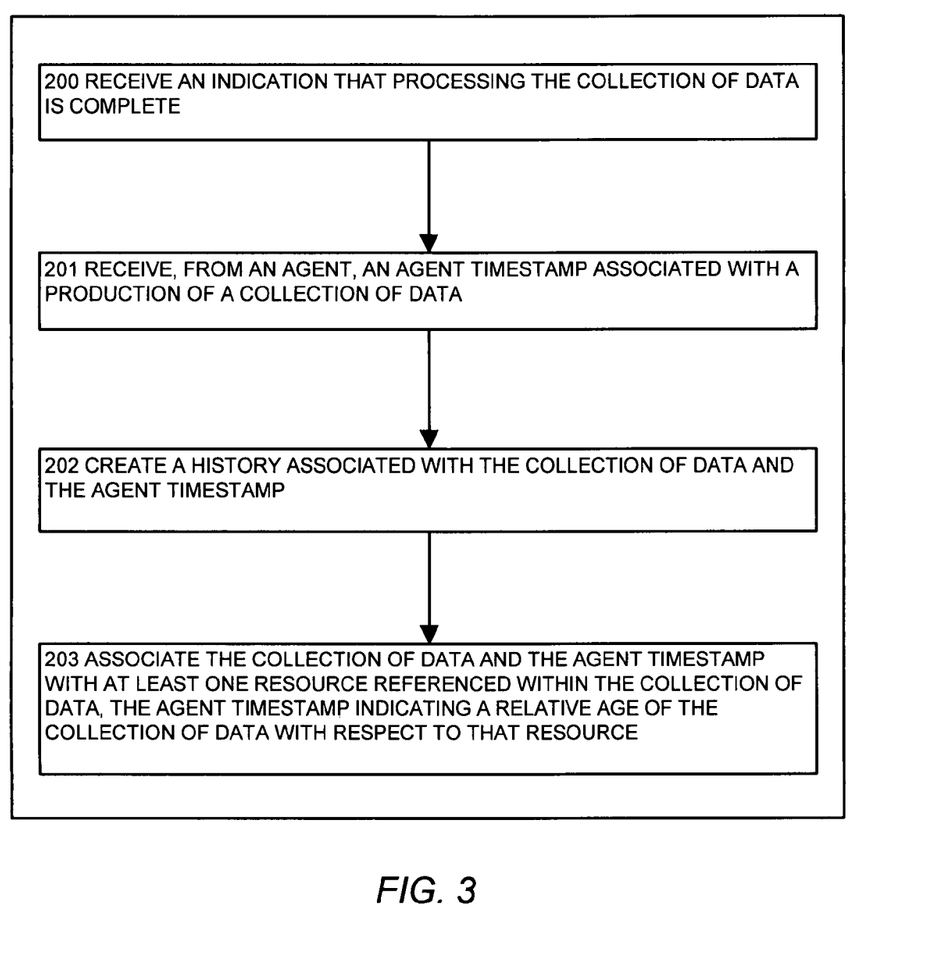
FIG. 3 illustrates a flowchart of a procedure performed by the system of FIG. 1 when the data management tracking process receives, from an agent, an agent timestamp associated with a production of a collection of data, according to one embodiment disclosed herein.

FIG. 3 is a flowchart of the steps performed by the data management tracking process 145-2 when it receives, from an agent 110, an agent timestamp 135 associated with a production of a collection of data 155.

In step 200, the data management tracking process 145-2 receives, from an agent 110, an agent timestamp 135 associated with a production of a collection of data 155. Periodically, the agent 110 collects collections of data 155 associated with resource 120. These collections of data 155 may include configuration or management data concerning the resource 120 that the agent 110 is responsible for managing. In an example embodiment, there are several scenarios that may trigger this response from the agent 110. For example, an action from a user may trigger the agent 110 to send an agent timestamp 135 (associated with a collection of data 155) to, for example, the server process 130. In another example embodiment, the agent timestamp 135 compares the collection of data 155 to a criterion or a data collection policy to determine if the collection of data 155 should be transmitted to, for example the server process 130, and if so, the agent 110 collects the data and includes an agent timestamp 135 in the notification.

In step 201, the data management tracking process 145-2 creates a history associated with the collection of data 155 and the agent timestamp 135. The data management tracking process 145-2 creates a history to associate the agent timestamp 135 (i.e., the time the agent 110 receives the collection of data 155) along with the resource 120 (e.g. a specific data storage system) associated with the collection of data 155 such that future reporting (provided by the history, for example, in the form of a history database 160) will allow users to identify the 'freshest' data for that resource. Once a history record is created from the initial notification and timestamp (sent from the agent to the server), the server can assign a store process to that agent to provide the ability for the agent to send its collected data (to which the timestamp is associated) to this assigned store process for storage within a managed object database used by the management application. During the time period of the agent and store process interaction, the store is able to access the history database to make entries of its own concerning various processing activities that the store performs. Store processing related to this will be described in detail shortly. The server operating the data management tracking process 145-2 can detect or determine when store processing is complete.

In step 202, the data management tracking process 145-2 receives an indication that processing the collection of data 155 is complete. In an example embodiment, the processing of the collection of data 155 is considered to be complete when the collection of data 155 is persisted into a production database. A console in communication with the production database allows users to view details associated with multiple resource 120 within the storage area network 100 and also to configure and/or manage those resource 120.

In step 203, the data management tracking process 145-2 associates the collection of data 155 and the agent timestamp 135 with at least one resource 120 referenced within the collection of data 155. The agent timestamp 135 indicates a relative age of the collection of data 155 with respect to that resource 120. Within the history, the data management tracking process 145-2 associates the agent timestamp 135 with the collection of data 155, and the resource 120 to identify the time at which the agent 110 received the collection of data 155. Within the history, the agent timestamp 135 is also associated with the resource 120 such that the freshness of the data (associated with the resource 120) can be identified. This allows the system to determine how old or new the data in the management database is with respect to particular resource from which this data has been collected.

Figure 4:
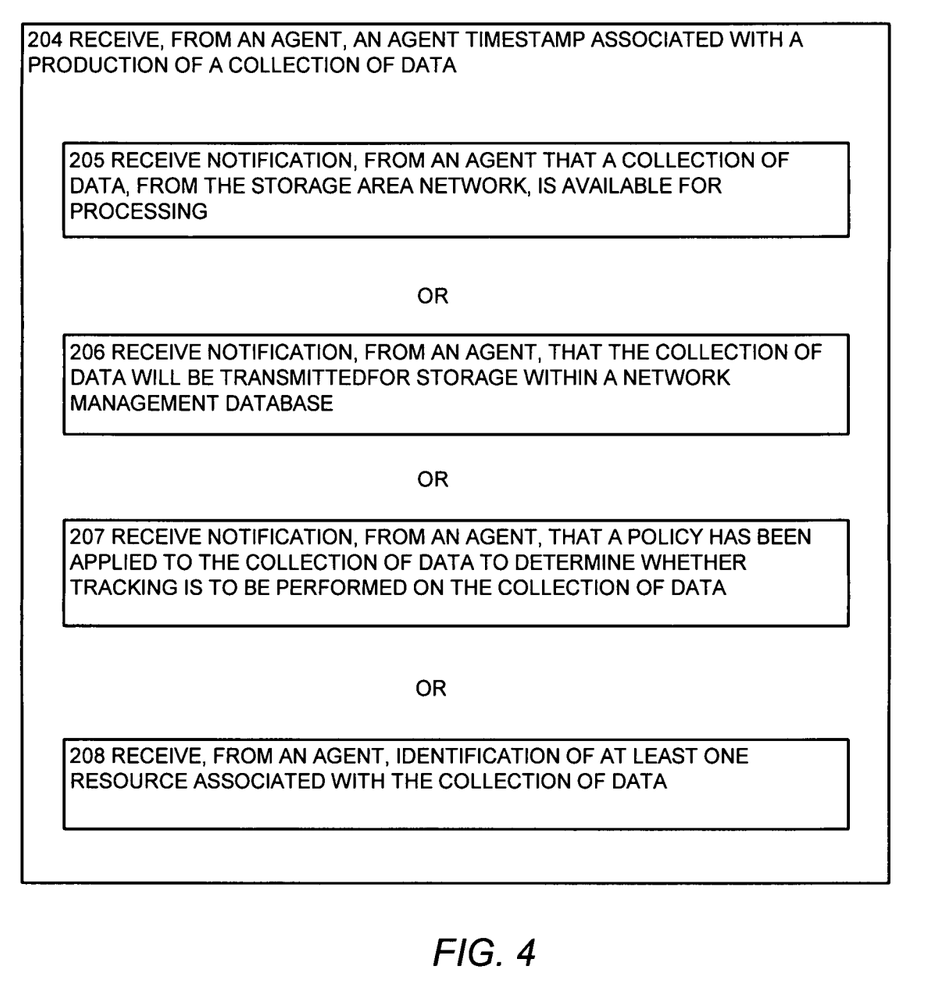
FIG. 4 illustrates a flowchart of a procedure performed by the system of FIG. 1 when the data management tracking process receives, from an agent, an agent timestamp along with notification that a collection of data, from the storage area network, is available for processing, according to one embodiment disclosed herein.

FIG. 4 is a flowchart of the steps performed by the data management tracking process 145-2 when it receives, from an agent 110, an agent timestamp 135 associated with a production of a collection of data 155.

In step 204, the data management tracking process 145-2 receives, from an agent 110, an agent timestamp 135 associated with a production of a collection of data 155. The agent 110 collects data (i.e., a collection of data 155) from a resource 120, such as a data storage array operating in a storage area network. Steps 205 through 208 describe various mechanisms and processing that allow the data management tracking process 145-2 to obtain the timestamp.

In step 205, the data management tracking process 145-2 receives notification, from an agent 110 that a collection of data 155, from the storage area network 100, is available for processing. In an example embodiment, the data management tracking process 145-2 also receives a notification of an available collection of data 155, along with the agent timestamp 135 associated with that collection of data 155.

Alternatively, in step 206, the data management tracking process 145-2 receives notification, from an agent 110, that the collection of data 155 will be transmitted for storage within a network management database. In an example embodiment, the data management tracking process 145-2, operating on the agent 110, notifies the server process 130 that a collection of data 155 is available to be transmitted from the agent 110 to the server process 130.

Alternatively, in step 207, the data management tracking process 145-2 receives notification, from an agent 110, that a policy has been applied to the collection of data 155 to determine whether tracking is to be performed on the collection of data 155. In an example embodiment, the agent 110 applies a Data Collection Policy (DCP) to the collection of data 155 to determine if the collection of data 155 is subject to tracking, and if the agent 110 should notify the server process 130 that a collection of data 155 is available. For example, applying a DCP to a collection of data 155 may determine whether enough data associated with the resource 120 has been collected to warrant notifying the server process 130 that a collection of data 155 is available and that timestamp or history data is to be maintained.

Alternatively, in step 208, the data management tracking process 145-2 receives, from an agent 110, identification of at least one resource 120 associated with the collection of data 155. In an example embodiment, the data management tracking process 145-2 identifies a principal object (i.e., the resource 120) associated with the collection of data 155.

Figure 5:
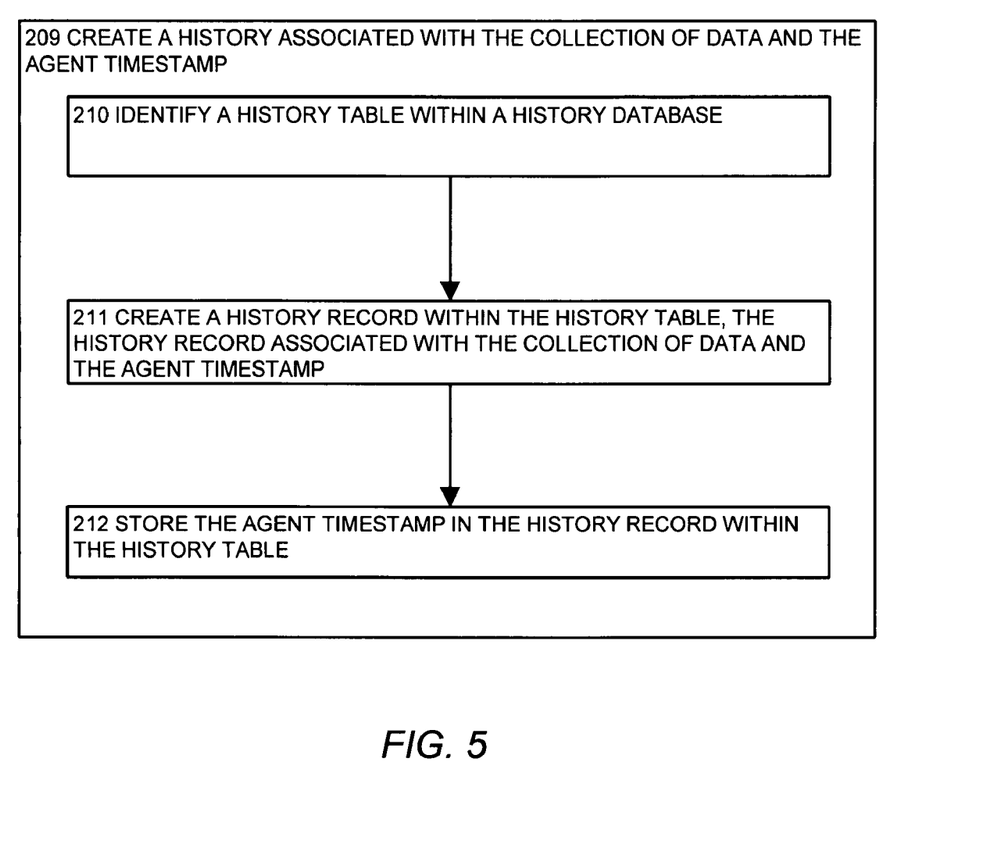
FIG. 5 illustrates a flowchart of a procedure performed by the system of FIG. 1 when the data management tracking process creates a history associated with the collection of data and the agent timestamp, according to one embodiment disclosed herein.

FIG. 5 is a flowchart of the steps performed by the data management tracking process 145-2 when it creates a history associated with the collection of data 155 and the agent timestamp 135. In one configuration, this processing of FIG. 5 is triggered by the notification from the agent including the timestamp data indicating when the agent has collected the data.

In step 209, the data management tracking process 145-2 creates a history associated with the collection of data 155 and the agent timestamp 135. In an example embodiment, the history is a history database 160 (i.e., a relational database) containing a plurality of tables including a history table 165 and the process 145-2 creates a row in the history table to be associated to the collection of data for a given resource 120.

In step 210, the data management tracking process 145-2 identifies a history table 165 within a history database 160. The data management tracking process 145-2 utilizes the history table 165 to track the agent timestamp 135 with the collection of data 155, and the resource 120 associated with the collection of data 155.

In step 211, the data management tracking process 145-2 creates a history record 170 within the history table 165. The history record 170 is associated with the collection of data 155 and the agent timestamp 135. In an example embodiment, the data management tracking process 145-2, operating on the server process 130, receives the collection of data 155 and the agent timestamp 135 and the data management tracking process 145-2 creates a new row (i.e., the history record 170) within the history table 165 for this timestamp data.

In step 212, the data management tracking process 145-2 stores the agent timestamp 135 in the history record 170 within the history table 165. The agent timestamp 135 is identified as the 'last discovery time' of the current collection of data 155. After creation of the record or row in the history table 165, the server process 130 can assign a storage process 150 to the agent 110 to allow that agent to send the collected data to the store 150 for storage. During store processing, the store 150 can also access the database 160 to further provide timestamp data concerning data collection or transaction processing into the history table 165. As an example, the store process 150 can include a version of the data management tracking process 145-2 that can receive data 155 from the agent 110 and can create one or more timestamps in the history table 165 indicating, for example, initial receipt of the data, as well as timestamps for various processing milestones completed by the store 150 during placement of the agent-collected data into a management database. The store 150 can, for example, provide other timestamps such as when the data is committed to the management database, timestamps for completion of processing of partitions of a transaction, and other events. Note the store process 150 may be operating in a remote geographic location on a computer system in a different time zone that the server or agent computers. As such, timestamps provided into the history record for that agent transaction by the store process may be in a time zone value other than that of the console and server processes. Further details of this will now be explained below.

Figure 6:
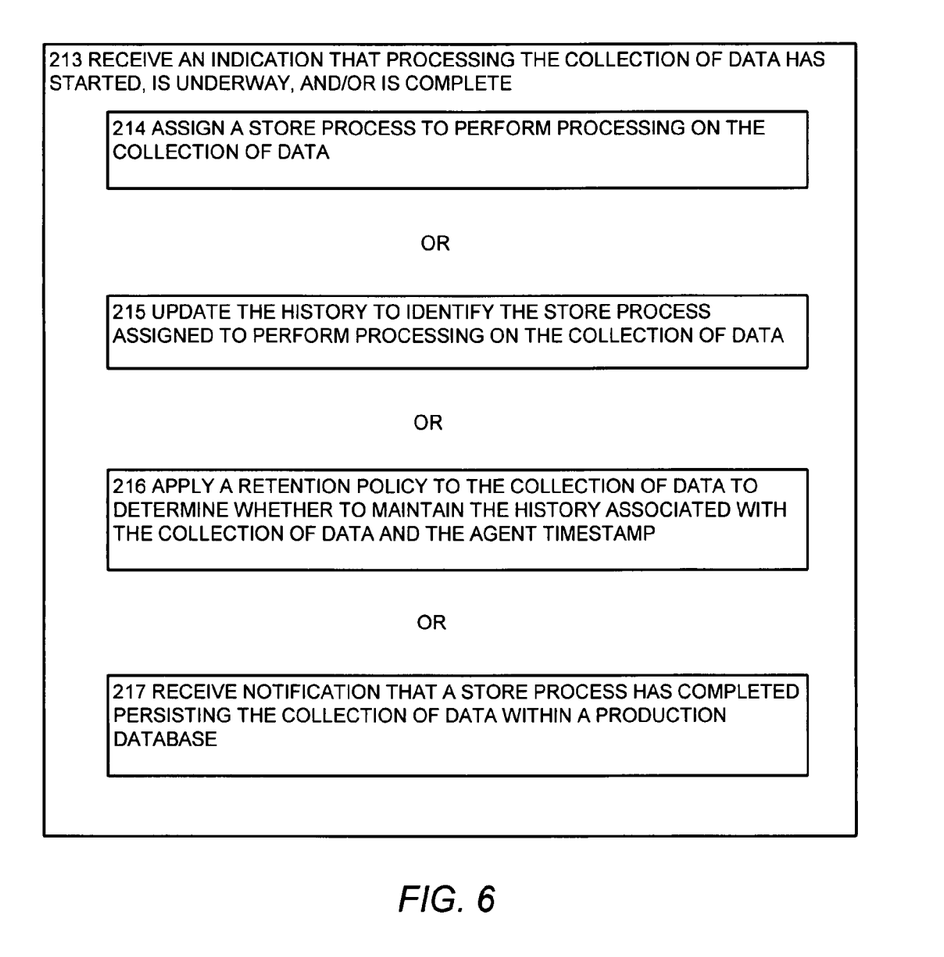
FIG. 6 illustrates a flowchart of a procedure performed by the system of FIG. 1 when the data management tracking process receives an indication that processing the collection of data is complete, according to one embodiment disclosed herein.

FIG. 6 is a flowchart of the steps performed by the data management tracking process 145-2 when it receives an indication that processing the collection of data 155 was started, is underway and is then completed by the store 150.

In step 213, the data management tracking process 145-2 receives an indication that processing the collection of data 155 is started, underway and/or complete by the store 150. In an example embodiment, the agent process 110 and the store process 150 perform a transactional staging process to persist the collection of data 155 within a production database. In another example embodiment, during this transactional staging process, additional timestamps as noted above are collected at a plurality of process points within the transactional staging process to capture processing times associated with various steps of the process. This plurality of timestamps, all normalized to a common time system, associated with various processing points within the transactional staging process allow visibility into the actual performance of the transactional staging process while the store 150 is performing this task. Details of this processing concerning the store process will now be explained in steps 214 through 217.

In step 214, the data management tracking process 145-2 assigns a store process to perform processing on the collection of data 155. In an example embodiment, the data management tracking process 145-2, operating on the server process 130, selects a store process 150 to process the collection of data 155 (i.e., persist the collection of data 155 into the production database). Just as there are a plurality of agents 110 collecting data from many resources, there may be a plurality of store processes 150 available to perform processing on the collection of data 155. The server process 130 selects one of these available store processes 150 to perform the processing on the collection of data 155.

Alternatively, in step 215, the data management tracking process 145-2 updates the history to identify the store process 150 assigned to perform processing on the collection of data 155. The data management tracking process 145-2 updates the history record 170 in the history table 165 with identification of the particular store process 150 that has been assigned to process the collection of data 155.

Alternatively, in step 216, the data management tracking process 145-2 applies a retention policy to the collection of data 155 to determine whether to maintain the history associated with the collection of data 155 and the agent timestamp 135. In an example embodiment, the data management tracking process 145-2 maintains a history record 170 within the history table 165 associated with the collection of data 155. As noted above, during store processing, the store 150 is able to create one or more timestamps into the history record 170 in the history table 165 concerning events that occur to store the data collected by the agent. In this manner, the history table 165 can include a comprehensive collection of timestamps, each associated with events of various entities (e.g. agents, server and store) involved with management data collection for a network such as a storage area network.

In step 217, the data management tracking process 145-2 receives notification that a store process 150 has completed committing the collection of data 155 within a production database. As an example, the data management tracking process 145-2 receives notification that the server process 130 and store process 150 have completed a transactional staging process. The collection of data 155 is now persisted in the production database and available to users via the console. A timestamp can be included in the history record for this aspect of processing.

Figure 7:
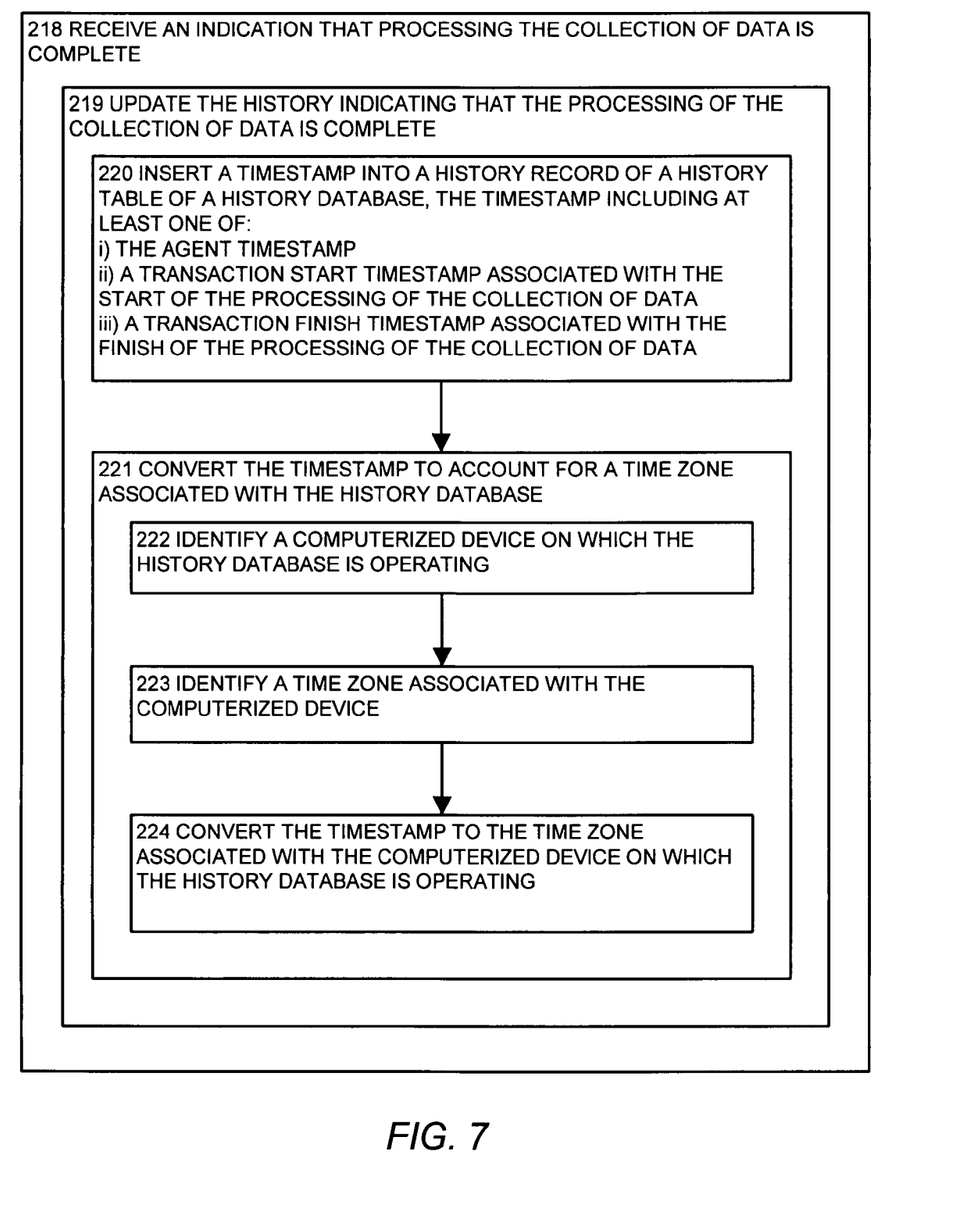
FIG. 7 illustrates a flowchart of a procedure performed by the system of FIG. 1 when the data management tracking process receives an indication that processing the collection of data is complete, and updates the history indicating that that processing of the collection of data is complete, according to one embodiment disclosed herein.

FIG. 7 is a flowchart of the steps performed by the data management tracking process 145-2 when it receives an indication that processing the collection of data 155 is complete.

In step 218, the data management tracking process 145-2 receives an indication that processing the collection of data 155 is complete. In an example embodiment, the server process 130 detects the presence of an agent timestamp 135 from the history record 170 within the history table 165 that has been created by the store process 150. The store process 150 assigns the agent timestamp 135 as the last time discovery occurred. This allows the server 150 to know that store processing is complete for agent data.

In step 219, the data management tracking process 145-2 updates the history indicating that the processing of the collection of data 155 is complete. In particular, the data management tracking process 145-2, operating on the server process 130, updates the history record 170 with a transaction done timestamp.

In step 220, the data management tracking process 145-2 inserts a timestamp into a history record 170 of a history table 165 of a history database 160. The timestamp may be a record that includes, for example: at least one of:

i) timestamp 135, indicating when the store received data from the agent ii) a transaction start timestamp associated with the start of the processing of the collection of data 155 between the agent 110 and the store 150, iii) a transaction finish timestamp associated with the finish of the processing of the collection of data 155 (e.g. when the data is committed to a management database). Note many other timestamps can be saved in the history record 170 for various events of the agent 110, the server 130 or the store 150. Thus the history table 165 can be created and used to keep a very detailed record of how agent collection and storage of data transpires for each agent, each time that agent collects and stores data. In this manner, the system disclosed herein can show not only how old data is within the management database, but since detailed records are kept on all phases of processing of agent data, post processing can be done to determine inefficiencies in such agent/store processing.

In an example embodiment, the history record 170 within the history table 165 has a column containing a string variable that represents the agent timestamp 135, the transaction start timestamp associated with the start of the processing of the collection of data 155, and the transaction start timestamp associated with the start of the processing of the collection of data 155.

In step 221, the data management tracking process 145-2 converts the timestamp to account for a time zone associated with the history database 160. In an example embodiment, there is a plurality of agents 110 collecting a plurality of collections of data 155 from a plurality of resources 120. Each computerized device on which each of the plurality of agents 110 run have their own system clock and may even be operating in different time zones. In order to provide a consistent indication of the freshest data within the history table 165, the data management tracking process 145-2 converts the string (that represents the agent timestamp 135, the transaction start timestamp associated with the start of the processing of the collection of data 155, and the transaction start timestamp associated with the start of the processing of the collection of data 155) to account for the time zone associated with the history database 160. Steps 222 through 224 show details of the conversion process.

In step 222, the data management tracking process 145-2 (e.g. in the server 150) identifies a computerized device on which the history database 160 is operating. The history database 160 may be operating on the same or different computerized device than the agent 110, server process 130 and/or store process 150.

In step 223, the data management tracking process 145-2 identifies a time zone associated with the computerized device on which the history table 165 is operating.

In step 224, the data management tracking process 145-2 converts the timestamp to the time zone associated with the computerized device on which the history database 160 is operating. For the timestamps discussed above, the data management tracking process 145-2 converts the string (that represents the agent timestamp 135, the transaction start timestamp associated with the start of the processing of the collection of data 155, and the transaction start timestamp associated with the start of the processing of the collection of data 155) to the time zone that corresponds to the time zone on which the computerized device on which the history table 165 is operating. The data management, tracking process 145-2 then inserts each of those three timestamps (agent timestamp 135, the transaction start timestamp associated with the start of the processing of the collection of data 155, and the transaction start timestamp associated with the start of the processing of the collection of data 155) into separate columns within the history record 170 of the history table 165.

Figure 8:
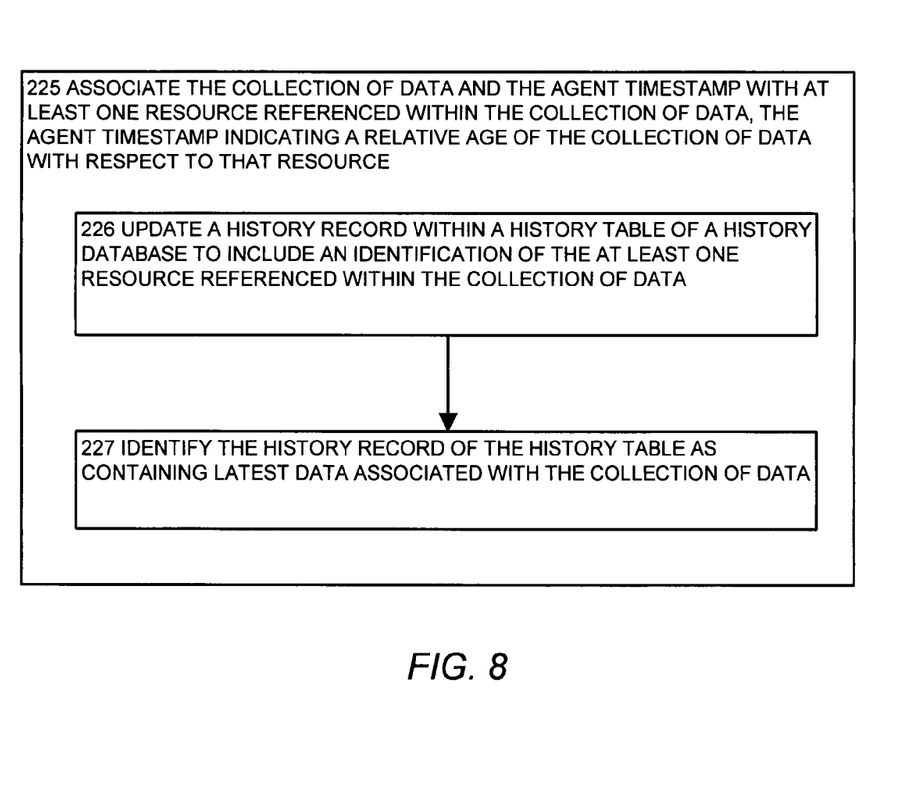
FIG. 8 illustrates a flowchart of a procedure performed by the system of FIG. 1 when the data management tracking process associates the collection of data and the agent timestamp with at least one resource referenced within the collection of data, according to one embodiment disclosed herein.

FIG. 8 is a flowchart of the steps performed by the data management tracking process 145-2 when it associates the collection of data 155 and the agent timestamp 135 with at least one resource 120 referenced within the collection of data 155.

In step 225, the data management tracking process 145-2 associates the collection of data 155 and the agent timestamp 135 with at least one resource 120 referenced within the collection of data 155. The agent timestamp 135 indicates a relative age of the collection of data 155 with respect to that resource 120. The data management tracking process 145-2 associates the collection of data 155 with the resource 120 (i.e., the principal object) so as to identify the 'freshest data' associated with the resource 120.

In step 226, the data management tracking process 145-2 updates a history record 170 within a history table 165 of the history database 160 to include an identification of at least one resource 120 referenced within the collection of data 155. In an example embodiment, the data management tracking process 145-2 updates the history record 170 within the history table 165 to include the resource 120 (i.e., the principal object) associated with the collection of data 155.

In step 227, the data management tracking process 145-2 identifies the history record 170 of history table 165 as containing latest data associated with the collection of data 155. The data management tracking process 145-2 identifies the history record 170 as containing the 'freshest data'.

Other alternative arrangements disclosed herein include rearranging the processing steps explained above in the flow charts in such a way that the overall effect disclosed herein is the same. It is to be thus understood by those skilled in the art that the particular arrangement of processing steps in many instances does not specify implementation of embodiments disclosed herein. As such, those skilled in the art of software development and computer-related technologies will understand that there can be many ways and orders of representing the processing operations explained above and such alternative software code will still achieve the overall effects explained herein. In addition, embodiments disclosed herein are not limited to operation on the computer systems shown above. The agents, store processes and management server (including change manager) can operate on shared computing resources, or can be distributed among any number of computer systems. Furthermore, embodiments disclosed herein are not limited to operation in a storage area network management application, but are intended to be generally applicable to any type of network management application. Accordingly, embodiments disclosed herein are not limited to the processing arrangements explained above.

Other arrangements of embodiments disclosed herein that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides an associated operations of the store process, as explained herein. The computer program logic, when executed on at least one processor with a computing system, causes the processor to perform the operations (e.g., the methods) indicated herein as embodiments disclosed herein. Such arrangements disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments disclosed herein.

Software processes that operate in a collection of computerized devices, such as in a group of storage area network management servers, hosts or other entities can also provide the system disclosed herein. The system disclosed herein can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system disclosed herein can be strictly as a software program, as software and hardware, or as hardware alone. Example embodiments disclosed herein may be implemented within EMC's Control Center software application that provides management functionality for storage area network resources and in computerized devices that operate the Control Center software. Control Center is manufactured by EMC Corporation of Hopkinton, Mass., USA.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A method of tracking data processing in a storage area network, the method comprising:
   receiving an indication that processing the collection of data is complete;
   receiving, from an agent, an agent timestamp associated with a production of a collection of data;
   creating a history associated with the collection of data and the agent timestamp, wherein creating a history associated with the collection of data and the agent timestamp comprises:
      storing a plurality of timestamps in the history record within the history table, the plurality of timestamps including:
         the agent timestamp indicating when the agent has collected data from the resource; and
         at least one store timestamp created by a store process that operates separately from the agent, the at least one store timestamp indicating when that store process has completed processing of data received by the agent from the store; and
      normalizing the plurality of timestamps to account for time zone differences associated with the timestamps; and
   associating the collection of data and the agent timestamp with at least one resource referenced within the collection of data, the agent timestamp indicating a relative age of the collection of data with respect to that resource.

2. The method of claim 1 wherein receiving, from an agent, an agent timestamp associated with a production of a collection of data comprises:
   receiving notification, from an agent that a collection of data, from the storage area network, is available for processing.

3. The method of claim 1 wherein receiving, from an agent, an agent timestamp associated with a production of a collection of data comprises:
   receiving notification, from an agent, that the collection of data will be transmitted for storage within a network management database.

4. The method of claim 1 wherein receiving, from an agent, an agent timestamp associated with a production of a collection of data comprises:
   receiving notification, from an agent, that a policy has been applied to the collection of data to determine whether tracking is to be performed on the collection of data.

5. The method of claim 1 wherein receiving, from an agent, an agent timestamp associated with a production of a collection of data comprises:
   receiving, from an agent, identification of at least one resource associated with the collection of data.

6. The method of claim 1 wherein creating a history associated with the collection of data and the agent timestamp comprises:
   identifying a history table within a history database;
   creating a history record within the history table, the history record associated with the collection of data and the agent timestamp; and
   storing the agent timestamp in the history record within the history table.

7. The method of claim 1 wherein receiving an indication that processing the collection of data is complete comprises:
   assigning a store process to perform processing on the collection of data.

8. The method of claim 7 further comprising:
   updating the history to identify the store process assigned to perform processing on the collection of data.

9. The method of claim 1 wherein receiving an indication that processing the collection of data is complete comprises:
receiving notification that a store process has completed persisting the collection of data within a production database.

10. The method of claim 1 wherein receiving an indication that processing the collection of data is complete comprises:
updating the history indicating that the processing of the collection of data is complete.

11. The method of claim 10 wherein updating the history indicating that that processing of the collection of data is complete comprises:
inserting a timestamp into a history record of a history table of a history database, the timestamp including at least one of:
the agent timestamp;
a transaction start timestamp associated with the start of the processing of the collection of data; and
a transaction finish timestamp associated with the finish of the processing of the collection of data.

12. The method of claim 11 further comprising:
converting the timestamp to account for a time zone associated with the history database.

13. The method of claim 12 wherein converting the timestamp to account for a time zone associated with the history database comprises:
identifying a computerized device on which the history database is operating;
identifying a time zone associated with the computerized device; and
converting the timestamp to the time zone associated with the computerized device on which the history database is operating.

14. The method of claim 1 wherein receiving an indication that processing the collection of data is complete comprises:
applying a retention policy to the collection of data to determine whether to maintain the history associated with the collection of data and the agent timestamp.

15. The method of claim 1 wherein associating the collection of data and the agent timestamp with at least one resource referenced within the collection of data comprises:
updating a history record within a history table of a history database to include an identification of the at least one resource referenced within the collection of data.

16. The method of claim 15 further comprising:
identifying the history record of the history table as containing latest data associated with the collection of data.

17. A computerized device comprising:
a memory;
a processor;
a communications interface;
an interconnection mechanism coupling the memory, the processor and the communications interface;
wherein the memory is encoded with a data management tracking application that when executed on the processor is capable of tracking data on the computerized device by performing the operations of:
receiving, from an agent, an agent timestamp associated with a production of a collection of data;
creating a history associated with the collection of data and the agent timestamp, wherein creating a history associated with the collection of data and the agent timestamp comprises:
storing a plurality of timestamps in the history record within the history table, the plurality of timestamps including:
the agent timestamp indicating when the agent has collected data from the resource; and
at least on store timestamp created by a store process that operates separately from the agent, the at least one store timestamp indicating when that store process has completed processing of data received by the agent from the store; and
normalizing the plurality of timestamps to account for time zone differences associated with the timestamps;
receiving an indication that processing the collection of data is complete; and
associating the collection of data and the agent timestamp with at least one resource referenced within the collection of data.

18. The computerized device of claim 17 wherein when the computerized device performs the operation receiving, from an agent, an agent timestamp associated with a production of a collection of data, the computerized device is capable of performing the operation of:
receiving notification, from an agent, that a policy has been applied to the collection of data to determine whether tracking is to be performed on the collection of data.

19. A computer program product having a non-transitory computer readable storage medium encoded with computer programming logic embodied in computer program code encoded thereon for tracking data processing in a storage area network comprising:
computer program code for receiving, from an agent, an agent timestamp associated with a production of a collection of data;
computer program code for creating a history associated with the collection of data and the agent timestamp, wherein computer program code for creating a history associated with the collection of data and the agent timestamp comprises:
computer program code for storing a plurality of timestamps in the history record within the history table, the plurality of timestamps including:
the agent timestamp indicating when the agent has collected data from the resource; and
at least one store timestamp created by a store process that operates separately from the agent, the at least one store timestamp indicating when that store process has completed processing of data received by the agent from the store; and
computer program code for normalizing the plurality of timestamps to account for time zone differences associated with the timestamps;
computer program code for receiving an indication that processing the collection of data is complete; and
computer program code for associating the collection of data and the agent timestamp with at least one resource referenced within the collection of data.

* * * * *